Feb. 19, 1957  G. L. WEST  2,781,542
ADJUSTABLE HINGE MECHANISM
Filed Jan. 31, 1955  5 Sheets-Sheet 2
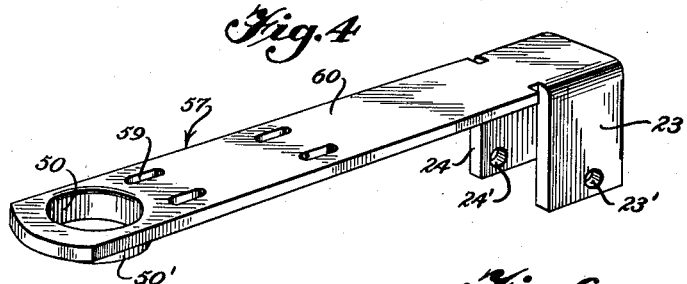
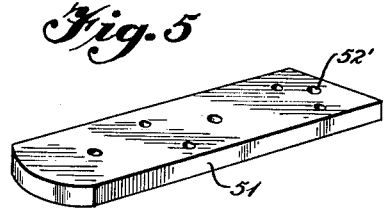
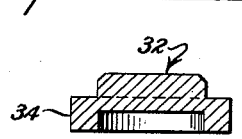
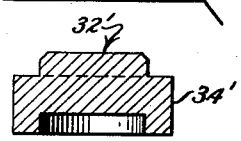
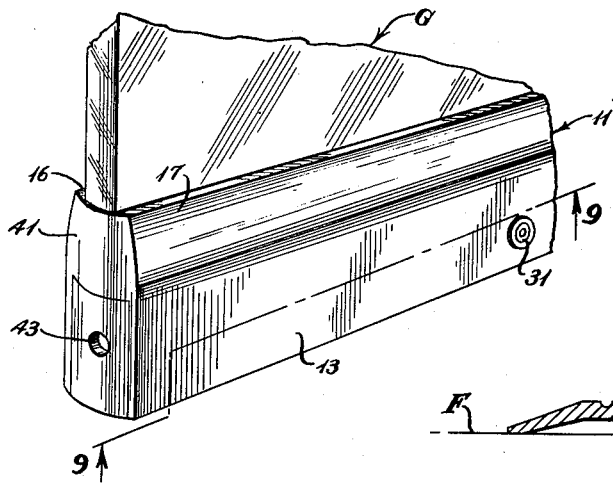
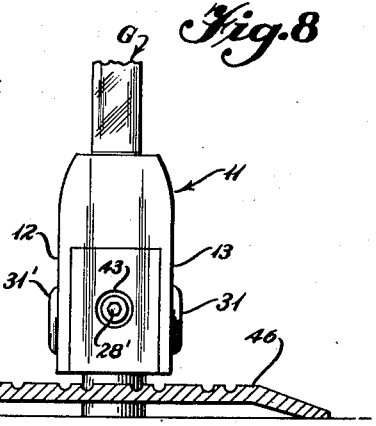
INVENTOR
George L. West
BY Oscar L. Spencer
ATTORNEY Feb. 19, 1957   G. L. WEST   2,781,542
ADJUSTABLE HINGE MECHANISM
Filed Jan. 31, 1955   5 Sheets-Sheet 3
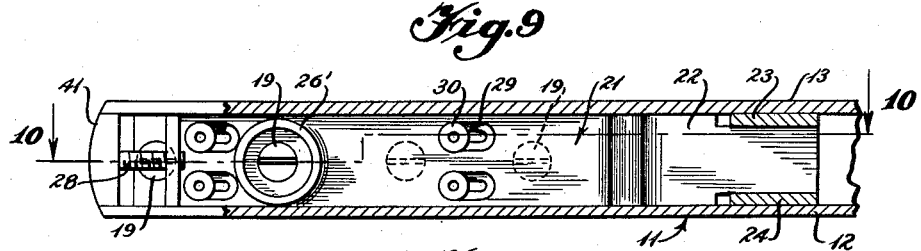
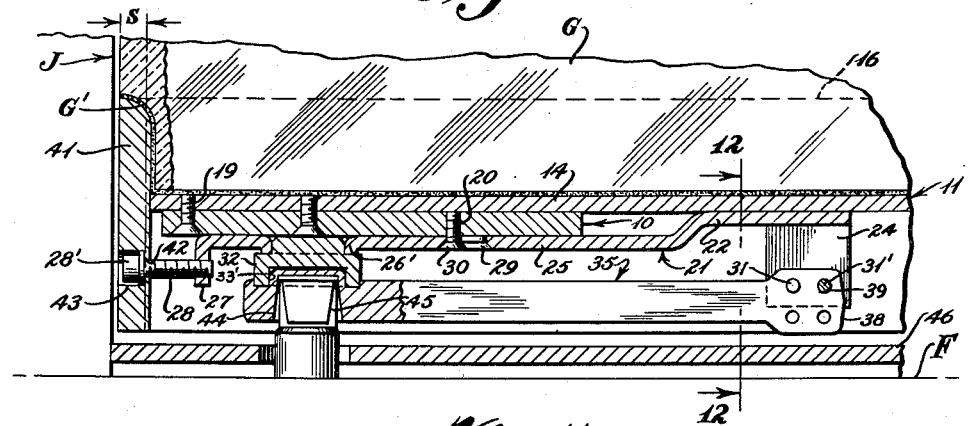
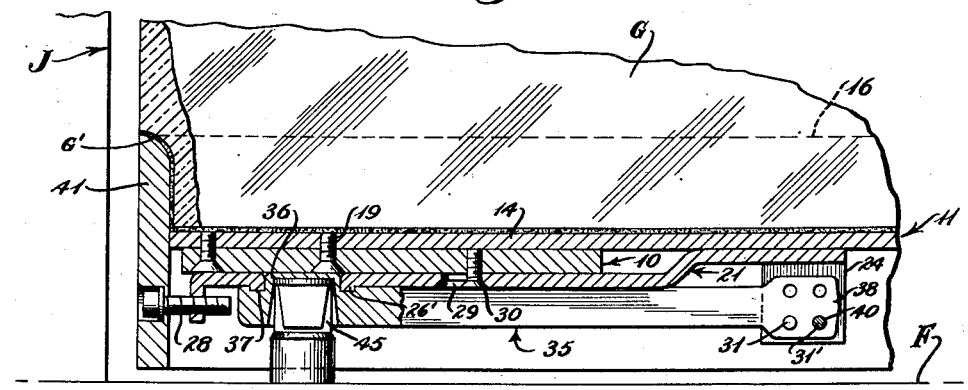
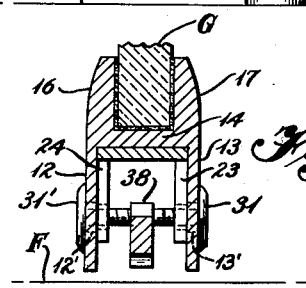
INVENTOR
*George L. West*
BY *Oscar L. Spencer*
ATTORNEY Feb. 19, 1957 G. L. WEST 2,781,542
ADJUSTABLE HINGE MECHANISM
Filed Jan. 31, 1955 5 Sheets-Sheet 4
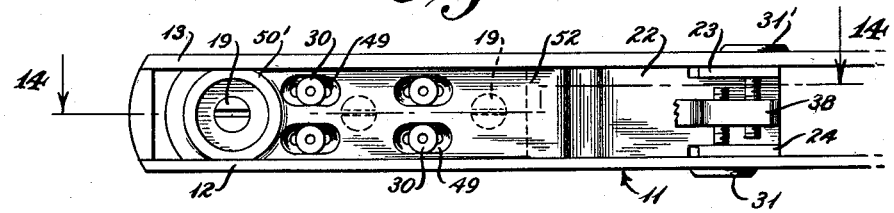
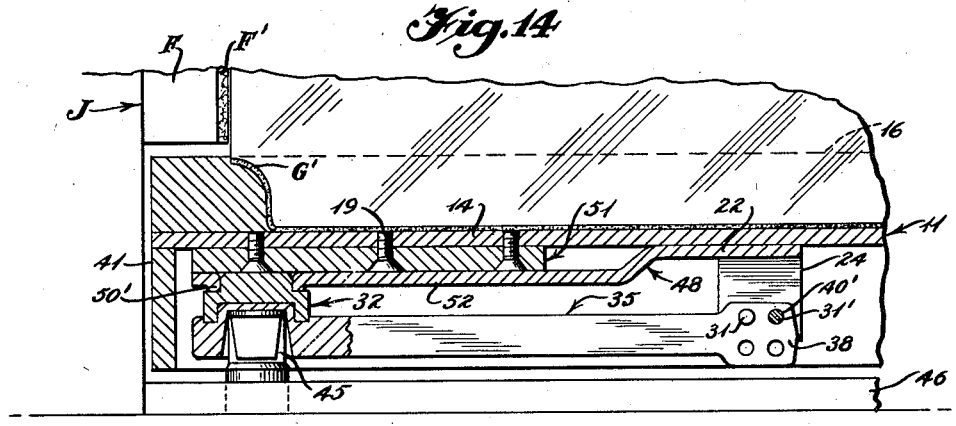
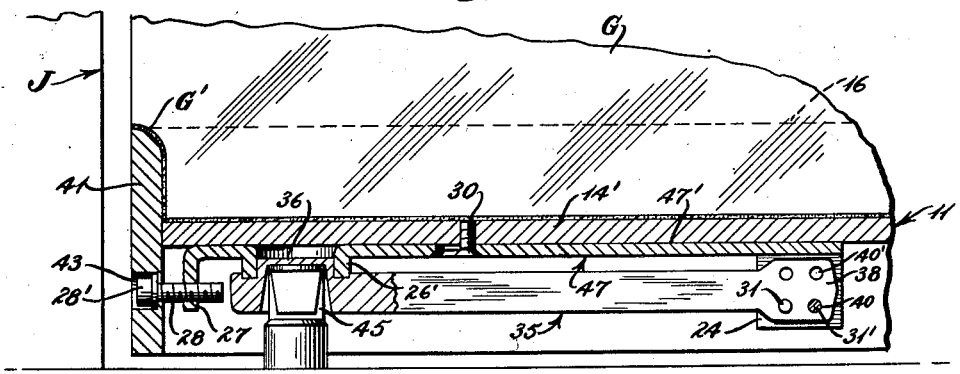
INVENTOR
George L. West
BY Oscar L. Spencer
ATTORNEY Feb. 19, 1957 — G. L. WEST — 2,781,542
ADJUSTABLE HINGE MECHANISM
Filed Jan. 31, 1955 — 5 Sheets-Sheet 5
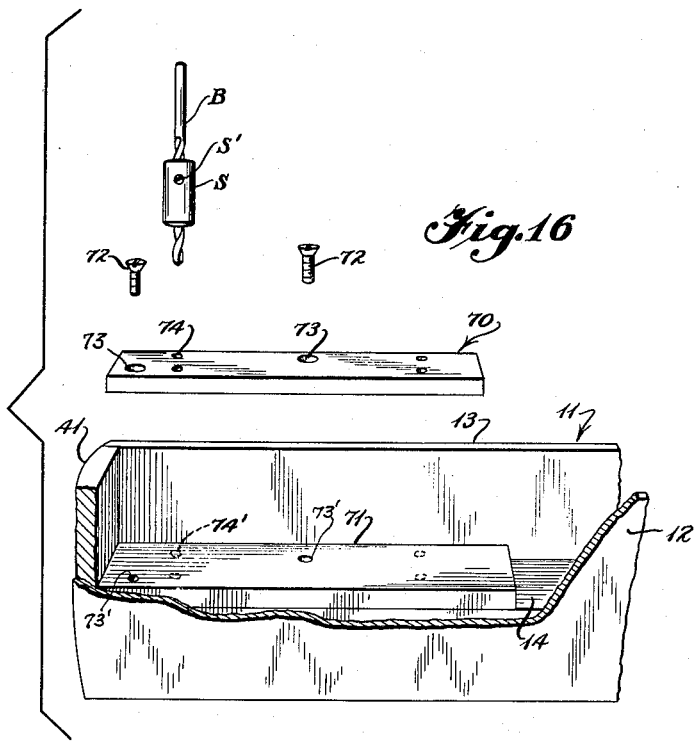
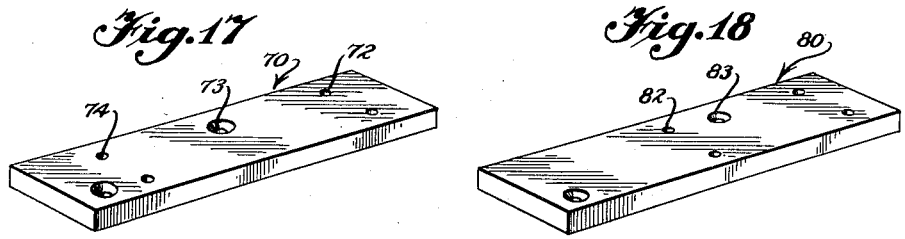
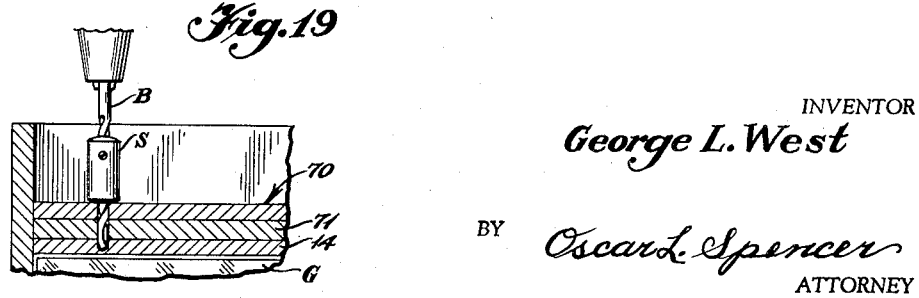
INVENTOR
George L. West
BY Oscar L. Spencer
ATTORNEY

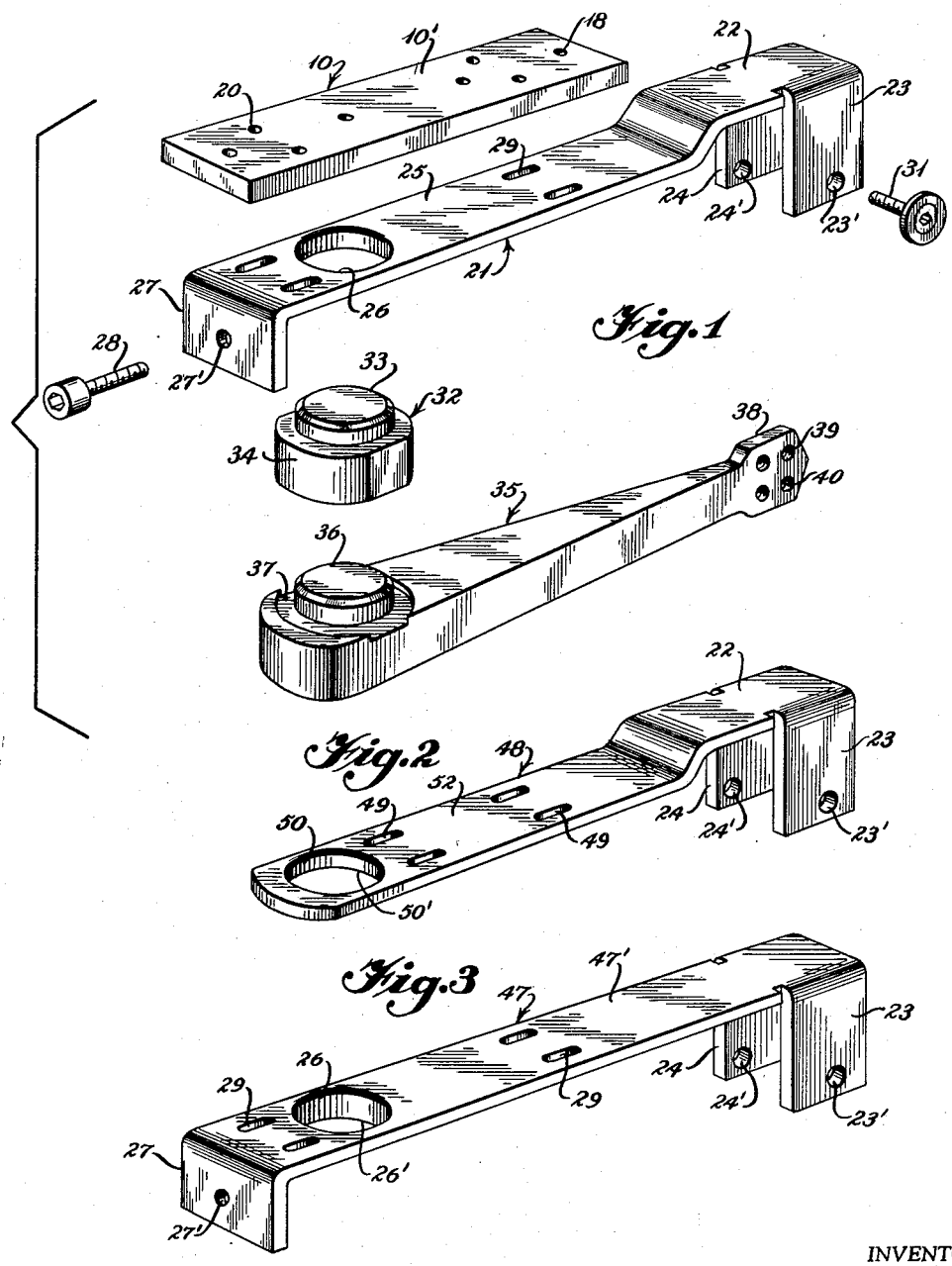

United States Patent Office 2,781,542
Patented Feb. 19, 1957

2,781,542

ADJUSTABLE HINGE MECHANISM

George L. West, Pittsburgh, Pa., assignor to Pittsburgh Plate Glass Company, Allegheny County, Pa., a corporation of Pennsylvania Application January 31, 1955, Serial No. 485,076

20 Claims. (Cl. 16—129)

My invention is directed to improvements in hinges for swinging doors and more particularly to the mounting of the door on checking floor hinges.

The arrangements now currently used to mount a door on a floor embedded door check are unsatisfactory. Such doors as use floor checks and hinge mountings thereon are usually heavy plate glass doors and the mounting of the same for swinging and checking movement is not simple. The mounting of such doors must permit adjustments laterally or edgewise toward and away from the jamb, the swing of the door so that it lines up parallel with the threshold and in addition height adjustment must be included. Under the arrangements heretofore the adjusted parts became loose and caused squeaking and wearing and in addition the parts would break, all of which leads to constant attention.

It is an object of my invention to provide in a checking floor hinge for a door a mounting permitting lateral, swing and height adjustments which when once accomplished will remain set.

A further object of my invention is to provide in a checking floor hinge for a door a base plate that is attached to the bottom of the web of the bottom door frame in a lateral adjustable manner and has provision for receiving a boss on a height adjusting collar or a boss on a check arm therebelow and a check arm that is received over a floor check post and having an upstanding boss thereon to be received by an aperture and collar on the base plate thereabove.

Another object of my invention is to provide in a check arm and base plate assembly an adapter plate to reinforce the bottom web of the door frame thereabove and to receive a base plate in an adjustably positionable manner.

A still further object of my invention is to provide in a check arm and base plate assembly, a base plate having depending flanges at one end adjacent the check arm adjusting end such that the flanges abut and add strength to the adjacent downturned channel elements at the base of the door.

Yet another object of my invention is to provide in a checking floor hinge assembly a base plate and check arm wherein the check arm is received over a check post protruding up from a floor check, the check arm has an upstanding boss above its check post mounting and an annular recess about the check post which receives a depending lip on a base plate or the skirt of an adjusting collar, and wherein the base plate is adjustable along the bottom of the door so as to position the door closer or farther away from a door jamb.

Another object of my invention is to provide in a checking floor hinge an adjustable mounting for height, swing and lateral movement of the door toward and away from a door jamb such that the pivot below the door is closely spaced from the door jamb permitting only a small clearance between the door jamb and the door thus reducing the possibility of fingers being jammed between the door and the jamb.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference may be had to the following description taken in conjunction with the drawings in which:

Fig. 1 is an exploded view of the parts making up a checking floor hinge assembly;

Fig. 2 is a base plate similar to that in Fig. 1 but without depending end flange;

Fig. 3 is a modified form of base plate to that shown in Fig. 1 but with the main portion not offset;

Fig. 4 is similar to the base plate shown in Fig. 3 but without the depending end flange;

Fig. 5 is an adapter or reinforcing plate for use with the base plate shown in Fig. 2;

Fig. 6 is a vertical cross sectional showing of a pair of different height spacer collars;

Fig. 7 is a fragmentary lower left-hand corner view in perspective of the bottom channel frame of a door having a check arm assembly mounted therein according to my invention;

Fig. 8 is an end view of the lower portion of a door as viewed from the rear showing the spacing when a threshold is utilized.

Fig. 9 is a bottom plan view along section line 9—9 of Fig. 7 looking into the bottom of the door;

Fig. 10 is a fragmentary cross sectional view showing the check hinge assembly of Fig. 1 in assembled position within a door;

Fig. 11 is similar to Fig. 10 but without the spacer collar utilized;

Fig. 12 is a vertical sectional view along section line 12—12 of Fig. 10 showing the adjusting screws for the checking arm;

Fig. 13 is a view similar to that of Fig. 9 looking up into the bottom of a door wherein the pivotal mounting of a check arm of the door is at the extreme hinge end of the check assembly;

Fig. 14 is a vertical sectional view along section line 14—14 of Fig. 13;

Fig. 15 is a vertical sectional view showing the base plate of Fig. 3 in assembled position within a door mounting;

Fig. 16 is an exploded perspective view of a fragmentary bottom end of a door showing a template for drilling the reinforcing or adapter plate for mounting the base plate;

Fig. 17 is a template such as used for drilling the holes in the adapter plate shown in Fig. 1;

Fig. 18 is a template used for drilling the holes in an adapter plate such as shown in Fig. 5 for use with the base plate such as shown in Fig. 2; and Fig. 19 is a vertical cross sectional view showing the drilling of the web of the bottom channel of a door according to the arrangement in Fig. 16.

Throughout the various figures and description like reference numerals refer to similar parts.

In Fig. 1 I have shown the parts going to make up a checking floor hinge assembly according to my invention. An adapter plate or reinforcing plate is generally indicated at 10 whose upper face 10' is placed in abutting relationship to the underneath web side of the bottom channel member generally indicated at 11 in Fig. 7. Referring to Figs. 10 and 12 the bottom frame piece for a door of plate glass G is shown with downturned sides 12 and 13, a central horizontally disposed web 14 and upturned sides 16 and 17.

Referring again to Fig. 1, the adapter plate 10 is provided with through apertures 18 which receive securing screws 19, see Fig. 11, which are threaded into the web 14 and hold the adapter plate 10 in reinforcing position beneath web 14. The adapter or reinforcing plate 10 is further provided with four spaced-apart threaded apertures 20, the purpose of which will be explained hereinafter.

Cooperating with the adapter plate 10 is a base plate generally indicated at 21 having a flat horizontal right-hand end 22 with downturned flanges 23 and 24, a main section or portion 25 offset downwardly from the upper portion 22 to be received against the bottom face of adapter plate 10 as shown in Fig. 10. The main portion or section 25 of base plate 21 has formed therein adjacent the hinge or left-hand end, as shown in Fig. 1, a vertically extending aperture 26 having a downturned annular lip 26', see Fig. 10, projecting below the lower surface of the main portion 25 while the left-hand or the hinge end of the base plate 21 has a downturned flange 27 with a threaded aperture 27' formed therein to receive the adjusting screw 28. Also formed in the main portion 25 of base plate 21 are spaced-apart elongated apertures 29 of which there are four in number. These are in alignment with the spacing of the threaded apertures 20 in adapter plate 10 such that screws 30, see Fig. 10, are received through the slots 29 and threadedly received in apertures 20 in adapter plate 10. Flanges 23 and 24 have formed therein relatively large apertures 23' and 24' through which the adjusting screws 31 and 31' for the check arm to be described freely pass.

An adapter collar generally indicated at 32 is formed with an upstanding circular boss 33 which is received in aperture 26 in base plate 21 while the lower portion 34 is formed with a recess 33' therein.

Below the adapter collar 32 is positioned the check arm generally indicated at 35 having an upstanding boss 36 at one end and projecting from the top face thereof and provided with an annular recess 37 formed in the top surface about the circular boss 36 such that it receives the annular skirt 34 of adapter collar 32 while boss 36 extends within the recess 33' of the collar. The right-hand end of check arm 35 is formed with a vertically extending portion 38 having a pair of top threaded apertures 39 and a pair of lower threaded apertures 40 formed therein and extending transversely therethrough. These apertures 39 and 40 are adapted to receive in a selected manner the adjusting screws 31 and 31' for angularly adjusting the door with respect to the check arm 35, as is customary. Holes 12' and 13' in downturned sides 12 and 13 are sufficiently large for passage of screws 31 and 31', respectively, as shown in Fig. 12, regardless of the position of arm 35 relative to channel 11 resulting from lateral adjustment of the door relative to base plate 21.

It will be observed in Fig. 10 that the glass panel G is received within the upturned portions 16 and 17 of the bottom frame channel member and has the left-hand corner notched as at G' to accommodate the end closure member 41 rigidly attached to the end of the lower channel frame at the hinge end thereof. End closure member 41 has a small recess 42 formed therein to receive the threaded screw 28 while a larger recess 43 in communication and in axial alignment therewith receives the head 28' of screw 28. Thus, by loosening the screws 30 the base member 21 may be moved edgewise along the adapter plate 10 by means of screws 28 so as to position the door either closer to or farther away from the door jamb generally indicated at J. After positioning the base plate 21, screws 30 are tightened and hold the base plate 21 in firmly secured position. Still referring to Fig. 10 it will be observed that the check arm 35 has formed below the boss 36 a recess 44 which is of elongated shape, not shown, to receive the upstanding post 45 of the check mechanism mounted in the floor F as is the customary construction. In the assembly shown in Fig. 10 a threshold is indicated at 46 and thus the door must be spaced properly thereabove and this is accomplished by means of the adapter collar 32 which provides for height adjustment.

Reference to Fig. 11 shows the same assembly as in Fig. 10, but without a threshold 46 and wherein the door is thus placed lower down and near the floor F. In such a case the adapter collar 32 is removed and the depending annular lip 26' on base plate 21 seats directly in the annular recess 37 surrounding upstanding boss 36 on the check arm 35. In the assembly shown in Fig. 11 it will be noted that the screws 31 and 31' are positioned in the lower threaded apertures 40 in the check arm 35 whereas in Fig. 10 screws 31 and 31' are positioned within the upper threaded apertures 39 in check arm 35.

In Fig. 9 it will be noted that the downwardly depending flanges 23 and 24 on the right-hand end 22 of base plate 21 fit in abutting relationship to the adjacent downturned flanges 12 and 13 of the bottom frame channel 11 of the door. This abutting fit of the downturned flanges 23 and 24 adjacent the side flanges 12 and 13 serves to reinforce the side flanges as the screws 31 and 31' are under tension in holding the end 38 of the check arm 35 in adjusted position to angularly position the door.

In Fig. 11 the door has been adjusted to the right and is farther away from the door jamb J than in Fig. 10 by the spacing S shown between the arrows in Fig. 10. This lateral or edgewise adjustment is accomplished by loosening the screws 30, 31 and 31' and adjusting screw 28 so that it pulls the door relative to this base plate 21 to the right to the extreme limit of the elongated slots 29 formed therein. In making this adjustment the size of apertures 12' and 13' in the side flanges 12 and 13 is sufficient with respect to the diameter of screws 31 and 31' to allow for this edgewise adjustment such that the door may be positioned with respect to the door jamb J either close thereto as shown in Fig. 10 or farther away as shown in Fig. 11 or at any intermediate distance. After the adjustment is made screws 30 are again tightened and the door at the hinge portion thereof is rigid and withstands the shock of repeated use without loosening the adjustment and becoming noisy.

In Fig. 3 a modified form of base plate is indicated generally at 47. It differs from the base plate 21 shown in Fig. 1 by having an entirely flat main section 47, with no offset therein with respect to the upper flat section 22 as indicated in Fig. 1 for the main section 25. As in the base plate 21 in Fig. 1, base plate 47 is formed with a vertically extending aperture 26 adjacent the hinge end thereof, elongated slots 29 extending longitudinally thereof for reception of the screws 30 threaded into the bottom of the door, a depending end flange 27 with a threaded aperture 27' therein, and depending side flanges 23 and 24 at the right-hand with apertures 23' and 24' formed therein in the same manner and for the same purpose as shown in Fig. 1 for base plate 21. Reference to Fig. 15 shows the installation of the base plate 47 having a main face 47' in direct abutting relationship to the bottom surface of web 14 and held in adjusted position thereagainst by means of screws 30. In this construction the depending annular lip 26' extends downwardly a slightly greater distance than the corresponding depending lip in the base plate 21. In the assembly shown in Fig. 15 there is no threshold and the bottom web 14' is of greater thickness and is adapted to directly receive the base plate 47 without the use of an adapter plate or reinforcing plate.

In Figs. 2 and 4 I have shown base plates whose vertical apertures therein, to be described hereinafter, are positioned at the extreme left-hand end of the hinge portion of the door such that the pivot for the door is positioned very close to the door jamb and there is very little spacing between the door jamb and the frame of the door thus preventing the insertion of fingers and providing in this respect a safety door.

In Fig. 2 a base plate is generally indicated at 48 and it is similar in construction to the base plate 21 shown in Fig. 1 except that all the elongated slots 49 are positioned to the right of the vertically extending aperture 50 which aperture is at the extreme left-hand end, the hinge end, of the base plate. Base plate 48 is formed with a downturned lip 50' best shown in Fig. 14 where the base plate 48 is shown in an assembled position. As in the base plate 21 the right-hand end of the base plate 48 is adapted to be positioned directly adjacent the lower surface of web 14 of the lower channel frame 11 of the door and it has depending flanges 23 and 24 which form a stiffening at the place where the tension screws 31 and 31' act on the extreme right-hand end of the check arm 35 for adjustment of the swing of the door.

Fig. 5 shows an adapter or reinforcing plate 51 which is used with the base plate 48 shown in Fig. 2 and in assembled position in Fig. 14. Adapter plate 51 has apertures 52' therein which receive securing screws 19 threadedly received in the web 14 to hold the reinforcing plate 51 tightly against the bottom of web 14 and strengthen the same for a more rigid construction. The main section 52 of base plate 48 is offset downward in a manner similar to the offset main portion 25 of base plate 21 shown in Fig. 1 such that it has abutting engagement with the lower face of the adapter plate 51 and is secured thereto by means of screws 30, see Fig. 13, received in the elongated slots 49 such that the base plate 48 has endwise adjustment by loosening the screws 30 and moving the base plate to the right or left and then retightening the screws 30. In Fig. 14 it will be noted that the door is positioned adjacent the threshold 46 and thus the spacer collar 32 is needed to space the door upward from the check pivot post 45. It will be noted that the check pivot post 45 extending upwardly from beneath the floor is positioned closer to the door jamb J in this construction and that the end closure 41 for the bottom channel frame member 11 is closely spaced to the door jamb J and that the glass G is spaced from the door jamb a relatively great distance such that a filler strip F with a weather guard F' is used to close the space between the door jam J and the vertical edge of the plate glass G.

In Fig. 4 I have shown a further modified base plate 57 which is somewhat similar to base plate 48 in Fig. 2 except that its main portion 60 has no offset therein. In each of the base plates 48 and 57 there is no depending end flange 27 as in the base plates 21 and 47 to receive an adjusting screw and all adjustment is carried out by means of the elongated slots shown therein. Base plate 57 has elongated slots 59 and a depending annular lip 50' defining the vertical aperture 50. In the construction shown in the base plate 57 the depending annular lip 50' extends down a greater distance than that shown for the base plate 48 in Fig. 2. In Fig. 4 the main section 60 of the base plate has abutting engagement with the bottom of the web 14 of the bottom frame 11 of the door in the assembled condition.

It will be noted in Fig. 6 that two typically different heights of adapter collars 32 and 32' are illustrated. In practice, these collars may have a skirt 34 or 34' of various sizes ranging from 3/8" to say 5/8" to provide for various height adjustments of the door above a particular threshold.

Reference is now made to Figs. 16 through 19 wherein are shown the templates and apparatus necessary for drilling and tapping the adapter plates already affixed to the channel member 11 such that they cannot be removed. The channel member 11 shown in Fig. 16 is the bottom of a door turned upside down and having the arcuate end closure 41 and the downturned channel portions 12 and 13 and web member 14 extending horizontally. A template is indicated at 70 for drilling the apertures in the adapter plate 71, see Fig. 16, to accommodate the base plate 21 as shown in Fig. 1. The assembly shown in Fig. 16 comprises the template 70 which would be secured to the adapter plate 71 by means of screws 72 passing through aperture 73 in the template 70 and threaded apertures 73' in plate 71. Apertures 73' had been used for mounting an earlier type of hinge assembly to channel member 11. Drill bit B is provided with an adjustable stop S secured thereto by screw S' such that, see Fig. 19, it will go down into the web 14 but not strike the glass G. This permits a tap to extend downward so as to tap threads in the holes so drilled in plate 71 such as 74' shown in Fig. 16. The guide holes 74 are positioned in the template 70 such that they serve to position the drill holes which are later threaded in position to be in alignment with the slots such as 29 shown in the base plate 21 in Fig. 1, as a typical illustration.

In Fig. 18 there is shown another template 80 which is used for drilling the web or base plate in connection with the use of the base plates 48 and 57. The guide holes in this template 80 are indicated at 82 while the securing apertures are indicated at 83 to receive the securing screw 72 as in Fig. 16.

In my checking floor hinge assemblies there is provided a rugged mounting for heavy doors. At the same time I have provided for lateral, height and swing adjustments which when made are secured such as by the screws 30 in the elongated slots of the base plates that the edgewise or lateral adjustment remains fixed. The swing adjustment is accomplished by the tension screws 31 and 31' as is customary at the end of the check arms 35 but at the same time I have provided a unique stiffening through the flanges 23 and 24 on the base plate where these screws apply a force on the downturned channel portion 12 and 13. Height adjustment is accomplished by using various sizes of adapter collars 32 and in some cases by using a base plate that directly abuts the door webs 14 such as shown in Fig. 15. To further the safety feature, the base plates such as 48 and 57 provide for a pivot or hinge point mounting very close to the door jamb so that a relatively small spacing occurs between the door jamb and the end of the bottom channel 11 there adjacent.

In the foregoing description, there are presented preferred embodiments of the invention in connection with glass doors. The invention is also applicable to other doors, such as wooden doors. Of course, with wooden doors there is no need to use a reinforcing plate and thus the main portion of the base plate is not offset. The base plate can be mounted directly to the door by means of wood screws through slots 29 or 59 of base 47 or 57, respectively.

I claim as my invention:

1. In a checking floor hinge for a door having a channel member having downturned sides and extending along the bottom end thereof, a base plate adjustably mounted for edgewise movement within said channel member adjacent the hinge edge of said door and having a main section provided with elongated slots extending in the edgewise direction of said bottom of the door, an aperture extending upwardly through the end thereof adjacent the hinge edge of the door and downwardly extending flanges at the other end thereof having abutting engagement with the inside of the downturned sides of the adjacent channel member, screw means extending through said slots in the main section of the base plate and securing it to the bottom of said door in the channel member in a slidably adjustable position and a check arm having an upstanding boss on the upper portion thereof at one end and received in said aperture in the end of the base plate, said check arm having a recess therein below said raised boss adapted to engage a check means therebelow when in an installed position.

2. A checking floor hinge as described in claim 1 for a door wherein said downturned sides of the channel member adjacent said abutting downwardly extending flanges on the base plate have aligned screw receiving means extending therethrough, said check arm has a vertically extending portion opposite said end with the boss, said vertically extending end portion on the check arm being adjacent said downwardly extending flanges on the base plate and having threaded apertures therein in alignment with the screw receiving means in said downturned sides of the channel member and the abutting downwardly extending flanges on the base plate and adjusting screws for the check arm received through said screw receiving means and in said threaded apertures, said downwardly extending flanges on the base plate reinforcing said downturned abutting sides of the channel member in the area of said last named adjusting screws.

3. In a checking floor hinge for a door having a channel member having downturned sides and extending along the bottom end thereof, a base plate adjustably mounted for edgewise movement within said channel member adjacent the hinge of said door and having a main section provided with elongated slots extending in the edgewise direction of said bottom of the door, an aperture extending upwardly through the end thereof adjacent the hinge edge of the door and having a downturned lip extending below the bottom of said main section and defining said aperture and downwardly extending flanges at the other end thereof having abutting engagement with the inside of the downturned sides of the adjacent channel member, screw means extending through said slots in the main section of the base plate and securing it to the bottom of said door in the channel member in a slidably adjustable position and a check arm having an upstanding boss on the upper portion thereof at one end with an annular recess formed in the upper portion of the check arm about said boss, said boss being received in said aperture in the end of the base plate, said annular recess about said boss in the check arm receiving said annular downturned lip on said base plate, said check arm having a recess below the boss therein adapted to engage a check means therebelow when in an installed position.

4. In a checking floor hinge for a door having a downturned channel member extending along the bottom end thereof, a base plate adjustably mounted for edgewise movement within said channel member adjacent the hinge edge of said door and having a main section provided with elongated slots extending in the edgewise direction of said bottom of the door and an aperture extending upwardly through the end thereof adjacent the hinge edge of the door, screw means extending through said slots in the main section of the base plate and securing it to the bottom of said door in the channel member in a slidably adjustable position and a check arm having an upstanding boss on the upper portion thereof at one end received in said aperture in the base plate, said check arm having a recess in the bottom thereof below said raised boss adapted to engage a check means therebelow when in an installed position.

5. In a checking floor hinge for a door having a downturned channel member extending along the bottom end thereof, a base plate adjustably mounted for edgewise movement within said channel member adjacent the hinge edge of said door and having a main section provided with elongated slots extending in the edgewise direction of said bottom of the door on an aperture extending upwardly through the end thereof adjacent the hinge edge of the door, a downturned annular lip formed on said main section and defining said vertical aperture therethrough, screw means extending through said slots in the main section of the base plate and securing it to the bottom of said door in the channel member in a slidably adjustable position and a check arm having an upstanding boss on the upper portion thereof at one end, an annular recess in the upper portion of said check arm about said boss, said boss being received in said aperture in the base plate and said annular depending lip on the base plate being received in said annular recess in the upper portion of said check arm about said boss, said check arm having a recess in the bottom thereof below said raised boss adapted to engage a check means therebelow when in an installed position.

6. In a checking floor hinge for a door having a channel member having downturned sides and extending along the bottom end thereof with the web of the channel extending horizontally, a reinforcing plate secured to said web between the downturned sides of the channel member adjacent the hinge edge of the door, a base plate having one end in engagement with the web of said channel member, a pair of flanges depending from said one end for abutting engagement with the inside of the downturned sides of the channel member, a main portion integral with said one end and offset downwardly therefrom and in abutting engagement with the bottom of the reinforcing plate and having elongated slots therein extending in the edgewise direction of said door bottom and an aperture extending vertically through the other end thereof, screw means extending through said slots in the main portion of the base plate and securing it to the reinforcing plate in the channel member in a slidably adjustable position and a check arm having an upstanding boss on the upper portion thereof at one end and received in said aperture in the end of the base plate, said check arm having a recess therein below said raised boss adapted to engage a check means therebelow when in an installed position.

7. A checking floor hinge of the character described in claim 6 wherein said main portion of the base plate has a depending annular lip formed thereon defining said aperture extending vertically through said other end thereof, said check arm having an annular recess formed in the upper portion thereof about said upstanding boss adapted to receive said annular depending lip on said main portion of the base plate.

8. In a checking floor hinge for a door having a channel member having downturned sides and extending along the bottom end thereof with the web of the channel extending horizontally, a reinforcing plate secured to said web between the downturned sides of the channel member adjacent the hinge edge of the door, a base plate having one end in engagement with the web of said channel member, a main portion integral with said one end and offset downwardly therefrom and in abutting engagement with the bottom of the reinforcing plate and having elongated slots therein extending in the edgewise direction of said door bottom and an aperture extending vertically therethrough in the other end thereof, screw means extending through said slots in the main portion of the base plate and securing it to the reinforcing plate in the channel member in a slidably adjustable position and a check arm having an upstanding boss on the upper portion thereof at one end and received in said aperture in the end of said base plate, said check arm having a recess therein below said raised boss adapted to engage a check means therebelow when in an installed position.

9. A checking floor hinge of the character described in claim 8 wherein said main portion of the base plate has an annular depending lip at said other end thereof, said depending annular lip defining said vertical aperture extending therethrough, said check arm having formed in the upper portion thereof an annular recess about said upstanding boss adapted to receive said depending annular lip in the main portion of said base plate.

10. In a checking floor hinge for a door having a channel member having downturned sides and extending along the bottom end thereof with the web of the channel extending horizontally, said channel member having an enclosed end at the hinge end thereof, a reinforcing plate secured to said web between the downturned sides of the channel member adjacent the hinge edge of the door, a base plate having one end in engagement with the web of said channel member, a main portion offset downwardly from said one end and in abutting engagement with the reinforcing plate, and having elongated slots therein extending in the edgewise direction of said door bottom and an aperture extending vertically therethrough adjacent the other end thereof and a downturned flange at said other end adjacent said aperture, adjusting screw means connecting said end closure at the hinge end of the channel member and said downturned flange on the hinge end of said base plate for slidably moving said base plate along said reinforcing plate, screw means extending through said slots in the main portion of the base plate and securing it to the reinforcing plate in the channel member in a slidably adjustable position and a check arm having an upstanding boss on the upper portion thereof at one end and received in said aperture in the end of the base plate, said check arm having a recess therein below said raised boss adapted to engage a check means therebelow when in an installed position.

11. A checking floor hinge of the character described in claim 10 wherein said main portion of the base plate has formed thereon a downturned annular lip at said other end thereof, said annular lip defining said vertically extending aperture therethrough, said check arm having an annular recess formed in the upper portion thereof about said boss adapted to receive said depending annular lip on the main portion of said base plate.

12. A checking floor hinge for a door of the character described in claim 10 wherein said base plate having said one end in engagement with the web of said channel member is formed with integral depending side flanges having abutting engagement with the adjacent inside of the downturned sides of the channel member.

13. A checking floor hinge for a door of the character described in claim 12 wherein said main portion of the base plate has formed thereon a downturned annular lip at said other end thereof, said annular lip defining said vertically extending aperture therethrough and said check arm having an annular recess formed on the upper portion thereof about said boss adapted to receive said depending annular lip on the main portion of said base plate.

14. A checking floor hinge of the character described in claim 12 having a spacer collar disposed between said check arm and said base plate and having an upstanding boss thereon received in said aperture in the base plate adjacent the hinge end thereof and a recess on the bottom thereof opposite from said boss which receives the upstanding boss on said check arm.

15. A checking floor hinge of the character described in claim 13 having a spacer collar disposed between said check arm and said base plate and having an upstanding boss thereon received in said aperture in the base plate and a bottom annular skirt portion received over said boss on the check arm and in said annular recess in the check arm about said boss.

16. In a checking floor hinge for a door having a channel member having downturned sides and extending along the bottom end thereof, said channel member having an end closure at the hinge end thereof, a base plate adjustably mounted for edgewise movement within said channel member adjacent the hinge edge of said door and having a main section provided with elongated slots therein extending in edgewise direction of said bottom of the door, an aperature extending vertically therethrough adjacent the hinge edge of the door and a downturned flange at the end thereof adjacent said aperture and adjacent the end closure of the channel member, adjusting screw means connecting said end of the channel member and said downturned flange on the hinge end of said base plate for slidably moving said base plate along said reinforcing plate, screw means extending through said slots in the main section of the base plate and securing it to the bottom of said door in the channel in a slidably adjustable position and a check arm having an upstanding boss on the upper portion thereof at one end and received in said aperture at the end of the base plate, said check arm having a recess therein below said raised boss adapted to engage a check means therebelow when in an installed position.

17. A checking floor hinge for a door of the character described in claim 16 wherein a spacer collar is positioned between said base plate and said check arm, said spacer collar having an upstanding boss received in said aperture at the end of said base plate and a recess therein below said boss adapted to receive said upstanding boss on said check arm.

18. A checking floor hinge for a door of the character described in claim 16 wherein said base plate has depending side flanges at the end thereof opposite said end having the aperture, said side flanges having abutting engagement with the adjacent inside face of said downturned portions of the channel member.

19. A checking floor hinge for a door of the character described in claim 18 including a spacer collar disposed between said base plate and the check arm, said spacer collar having an upstanding boss received within said aperture in the end of said base plate and a recess there-beneath which receives said upstanding boss on said check arm.

20. A checking floor hinge for a door of the character described in claim 18 wherein said base plate has an annular depending lip at the hinge end thereof which defines said vertical aperture therethrough, said check arm has an annular recess formed therein about said boss and a spacer collar positioned between said base plate and said check arm and having an upstanding boss thereon received in said aperture on the base plate and annular depending skirt received over said boss on the check arm and within said annular recess about said check arm boss.

References Cited in the file of this patent

UNITED STATES PATENTS

| | | |
|---|---|---|
| 1,169,283 | Peterick | Jan. 25, 1916 |
| 2,530,331 | Hubbs | Nov. 14, 1950 |